(12) United States Patent
Wang

(10) Patent No.: US 10,133,534 B2
(45) Date of Patent: Nov. 20, 2018

(54) IMAGE PROCESSING METHOD AND APPARATUS FOR INTERACTIVE AUGMENTED REALITY

(71) Applicant: Tencent Technology (Shenzhen) Company Limited, Shenzhen (CN)

(72) Inventor: Xiaoting Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/715,661

(22) Filed: Sep. 26, 2017

(65) Prior Publication Data

US 2018/0018141 A1 Jan. 18, 2018

Related U.S. Application Data

(63) Continuation of application No. PCT/CN2016/099941, filed on Sep. 23, 2016.

(30) Foreign Application Priority Data

Nov. 25, 2015 (CN) .......................... 2015 1 0833823

(51) Int. Cl.
*G06T 19/00* (2011.01)
*G06F 3/14* (2006.01)
(Continued)

(52) U.S. Cl.
CPC ......... *G06F 3/1462* (2013.01); *G02B 27/017* (2013.01); *G06F 3/147* (2013.01);
(Continued)

(58) Field of Classification Search
CPC .............................. G06T 19/006; G06T 19/00
(Continued)

(56) References Cited

U.S. PATENT DOCUMENTS

2004/0189675 A1* 9/2004 Pretlove ................. B25J 9/1656
345/633
2011/0035684 A1* 2/2011 Lewis ..................... A63F 13/10
715/753

(Continued)

*Primary Examiner* — Jin Ge
(74) *Attorney, Agent, or Firm* — Brinks Gilson & Lione

(57) ABSTRACT

The present disclosure relates to methods and systems for generating augmented reality. The method may include capturing a first image in a viewing range of a first augmented reality device in real time via a camera of the first augmented reality device, and synchronizing the first image to a second augmented reality device, the first augmented reality device being a device for providing an augmented reality image to a first user in the first display, and the second augmented reality device being a device for providing an augmented reality image to a second user in a second display. The method further includes receiving a second image from the second augmented reality device, the second image being an image returned in real time by the second augmented reality device after augmenting the first image by the second augmented reality device. The method further includes generating the augmented reality image to the first display at the first augmented reality device based on the first image and the second image, and displaying the augmented reality image in the first display at the first augmented reality device.

15 Claims, 2 Drawing Sheets

(51) Int. Cl.
*H04N 21/41* (2011.01)
*H04N 21/4363* (2011.01)
*G06T 11/60* (2006.01)
*G06F 3/147* (2006.01)
*G09G 3/00* (2006.01)
*H04N 21/414* (2011.01)
*H04N 21/4223* (2011.01)
*H04N 21/43* (2011.01)
*H04N 21/4788* (2011.01)
*G02B 27/01* (2006.01)
*G06F 3/01* (2006.01)

(52) U.S. Cl.
CPC .............. *G06T 11/60* (2013.01); *G09G 3/003* (2013.01); *H04N 21/41* (2013.01); *H04N 21/41407* (2013.01); *H04N 21/4223* (2013.01); *H04N 21/43* (2013.01); *H04N 21/4363* (2013.01); *H04N 21/43637* (2013.01); *H04N 21/4788* (2013.01); *G06F 3/013* (2013.01)

(58) Field of Classification Search
USPC ......................................................... 345/633
See application file for complete search history.

(56) References Cited

U.S. PATENT DOCUMENTS

| | | | |
|---|---|---|---|
| 2012/0162207 A1* | 6/2012 | Hwang | G06T 19/006 345/419 |
| 2012/0195464 A1* | 8/2012 | Ahn | G06Q 30/02 382/103 |
| 2012/0263154 A1* | 10/2012 | Blanchflower | G06F 17/30247 370/338 |
| 2012/0299962 A1* | 11/2012 | White | G02B 27/017 345/633 |
| 2013/0196772 A1* | 8/2013 | Latta | A63F 13/48 463/42 |
| 2015/0002541 A1* | 1/2015 | Dillavou | G06T 19/006 345/633 |
| 2015/0178990 A1* | 6/2015 | Ng-Thow-Hing | G06T 19/006 715/850 |
| 2015/0213649 A1* | 7/2015 | Morishita | G06T 19/006 345/419 |
| 2016/0212370 A1* | 7/2016 | Lee | H04N 5/44591 |
| 2016/0353055 A1* | 12/2016 | Popescu | G06T 19/006 |
| 2016/0358383 A1* | 12/2016 | Gauglitz | G06T 19/006 |

* cited by examiner

IMAGE PROCESSING METHOD AND APPARATUS FOR INTERACTIVE AUGMENTED REALITY

CROSS-REFERENCE TO RELATED APPLICATION

This application claims priority to International Patent Application No. PCT/CN2016/099941, filed on Sep. 23, 2016, which claims priority to Chinese Patent Application No. 201510833823.7 filed with the Chinese Patent Office on Nov. 25, 2015, and entitled "INFORMATION TRANSMISSION METHOD AND APPARATUS FOR AUGMENTED REALITY" both of which are incorporated by reference in their entireties.

FIELD OF THE TECHNOLOGY

The present disclosure relates to the field of augmented reality, and in particular, to an image processing and communication method and apparatus in augmented reality applications.

BACKGROUND OF THE DISCLOSURE

Augmented reality (AR for short) is a technology of calculating, in real time, a viewing position and viewing angle of an image of an environment viewed from an entity and captured by a camera, and adding to the image virtual elements that may be seen by another entity. This technology aims at superposing a virtual object onto the real world for viewing and for facilitating immersive experience.

Microsoft Hololens is one example of systems that implement AR. A user may view a virtual object by using the Hololens system. The virtual object may be generated by computers and superimposed onto a real world image.

However, the Hololens system only supports superimposing computer-generated virtual objects or animation onto the real world images, and provides the superposed images to a single-ended user. Such a system does not provide mutual interactions between multiple users, greatly limiting the application of augmented reality technology.

For the foregoing problem, no effective solution has been provided currently.

SUMMARY

Embodiments of the present disclosure provide an image processing and transmission method and apparatus for augmented reality.

In one implementation, the method may include capturing a first image in a viewing range of a first augmented reality device in real time via a camera of the first augmented reality device, and synchronizing the first image to a second augmented reality device, the first augmented reality device being a device comprising a first memory for storing a first set of instructions and a first processor for executing the first set of instructions to provide an augmented reality image to a first user via a first display, and the second augmented reality device being a device comprising a second memory for storing a second set of instructions and a second processor for executing the second set of instructions to provide an augmented reality image to a second user via a second display; receiving a second image from the second augmented reality device, the second image being an image returned in real time by the second augmented reality device after augmenting the first image by the second augmented reality device; generating the augmented reality image to the first user at the first augmented reality device based on the first image and the second image; and displaying the augmented reality image in the first display at the first augmented reality device.

In another implementation, a system for augmented reality is disclosed. The system includes a first augmented reality device for providing an augmented reality image to a first user in a first display, the first augmented reality device comprising a camera, a memory storing instructions, and a processor in communication with the camera and the memory. The processor, when executing the instructions, is configured to cause the first augmented reality device to capture a first image via the camera in a viewing range of the first augmented reality device in real time, and synchronize the first image to a second augmented reality device, the second augmented reality device being a device providing an augmented reality image to a second user in a second display; receive a second image from the second augmented reality device, the second image being an image returned in real time by the second user after augmenting the first image by the second augmented reality device; generate the augmented reality image to the first display based on the first image and the second image; and display the augmented reality image in the first display.

In the various implementations of the present disclosure, a first image in a viewing range of a first augmented reality device is captured in real time, and the first image is synchronized to a second augmented reality device, where the first augmented reality device is a device providing an augmented reality image to a first user, and the second augmented reality device is a device providing an augmented reality image to the second user. After the first image is synchronized to the second augmented reality device, the second user performs an operation action based on viewing the first image. The first image is augmented with an image captured by a camera of the second augmented reality device and representing the operation action to obtain the second image, and the second image is displayed to the first user in real time and in a manner depending on whether the first image and second image are similar (or whether the superposition of images has significantly modified the first image). This process may go either way between the first and the second augmented reality devices. As such, interactive augmented reality between the first user and the second user may be achieved.

BRIEF DESCRIPTION OF THE DRAWINGS

The accompanying drawings described herein are used for providing a further understanding of the present disclosure, and form a part of the present disclosure. Exemplary embodiments of the present disclosure and their description are intended for explaining rather than limiting the present disclosure. In the accompanying drawings.

DESCRIPTION OF EMBODIMENTS

The following disclosure describes the technical solutions in various embodiments of the present disclosure with reference to the accompanying drawings. The described embodiments are merely examples. Other embodiments and implementations that may be derived from the present disclosure without creative efforts shall fall within the protection scope of the present disclosure.

It should be noted that, the terms "first" and "second" in the specification and the claims of the present disclosure and the foregoing accompanying drawings are used for distinguishing similar objects, and are not intended for describing a particular sequence or order. It should be understood that the labels used in this way is interchangeable in a suitable case, so that the embodiments of the present disclosure described herein can be implemented in sequences or orders other than those shown or described herein. In addition, the terms "include", "comprise", and any variants thereof are intended to be non-exclusive. For example, a process, method, system, product, or device that includes a series of steps or elements is not limited to the steps or elements that are clearly listed, but may include other steps or elements.

Embodiment 1

According to this embodiment of the present disclosure, a method that may be performed by using an apparatus embodiment of the present disclosure is provided. It should be noted that, steps shown in the flowchart of the accompanying drawings may be performed in a computer system of a group of computers having executable instructions, and although the flowchart shows the logical sequence, in some cases, the shown or described steps may be performed in a sequence different from the sequence herein.

According to this embodiment of the present disclosure, an image processing and transmission method for augmented reality is provided.

Figure 1:
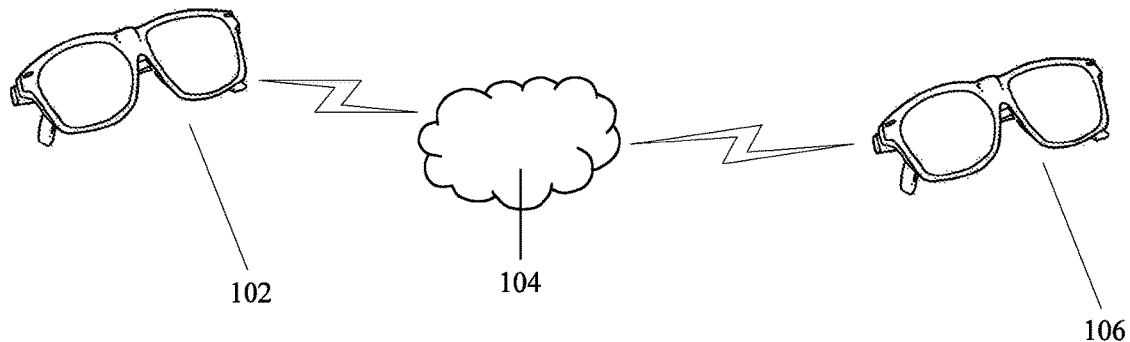
FIG. 1 illustrates a system and environment in which an image processing and transmission method for augmented reality according to an embodiment of the present disclosure may be applied.

In one implementation, the image processing and transmission method for augmented reality may be applied to a system and environment including a first terminal 102, a network 104, and a second terminal 106 shown in FIG. 1. As shown in FIG. 1, the first terminal 102 communicates with the second terminal 106 by using the network 104. The network 106 may include but is not limited to: a mobile communications network, a wide area network, a metropolitan area network, or a local area network. Both the first terminal 102 and the second terminal 104 may be an augmented reality device.

A main function of the system shown in FIG. 1 is: When a first user intends to share an image representing what the first user sees in his/her sight or viewing range to a second user, the first user may use the first augmented reality device 102 to capture the image in real time and transmit the image in real time to the second augmented reality device 106 via the network 104. In this case, the second augmented reality device 106 may display the image that the first user sees to the second user, and the second user may then perform an operation based on viewing the image displayed by the second augmented reality device 106. At the same time, a second image including the first image and an image representing the operation may be synchronized to the first augmented reality device 102 by using the second augmented reality device 106, and displayed to the first user by the first augmented reality device 102 for facilitating an interaction between the first user and the second user.

Figure 2:
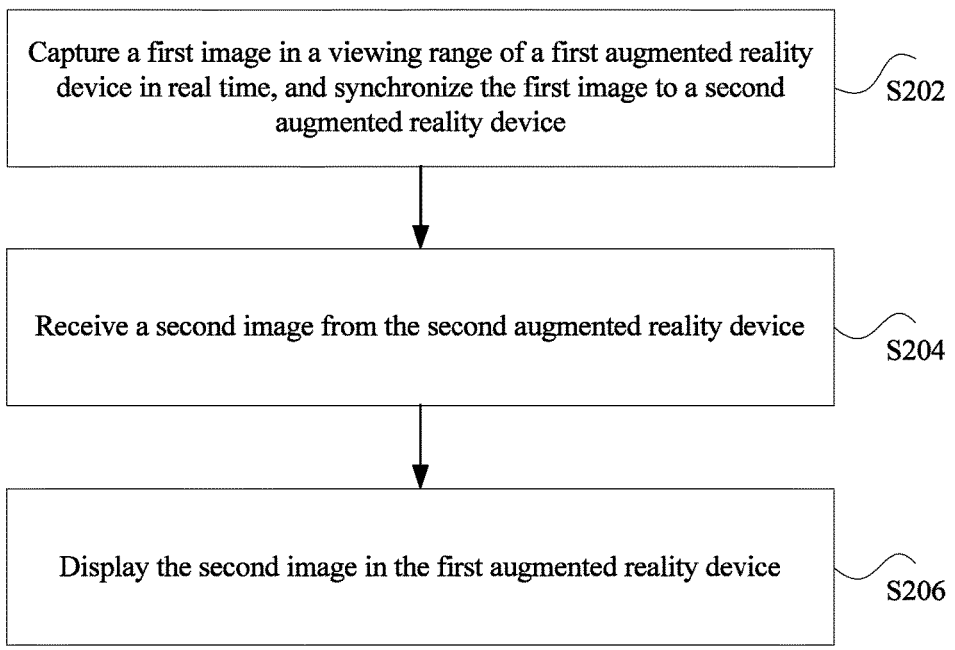
FIG. 2 is a logic flow of an image processing and transmission method for augmented reality according to an embodiment of the present disclosure.

FIG. 2 is a logic flow of the exemplary image processing and transmission method for augmented reality. The following specifically describes, with reference to FIG. 2, the image processing and transmission method for augmented reality. As shown in FIG. 2, the image processing and transmission method for augmented reality may include steps S202 to step S206:

S202. Capture a first image in a viewing range of a first augmented reality device in real time, and synchronize the first image to a second augmented reality device, where the first augmented reality device is a device providing an augmented reality image to a first user, and the second augmented reality device is a device providing an augmented reality image to a second user.

S204. Receive a second image from the second augmented reality device, where the second image is an image returned in real time by the second user after operating the first image via the second augmented reality device.

S206. Display the second image in the first augmented reality device. The second image may be displayed via a display device of the first augmented reality device.

In this embodiment of the present disclosure, the first user and the second user are different users, and may be at separate locations. The first user has a first augmented reality device, the second user has a second augmented reality device, and the first augmented reality device and the second augmented reality device may be of the same or different types of augmented reality devices. The first user captures and records a first image by using the first augmented reality device, and synchronously transmits the first image to the second augmented reality device in real time, the second user operates based on viewing the first image from the second augmented reality device, to obtain a second image, and returns the second image in real time to the first augmented reality device, and the first augmented reality device displays the second image to the first user in real time. The viewing by the second user of the first image may be via a display device of the second augmented reality device.

In the image processing and transmission method for augmented reality provided in this embodiment of the present disclosure, the first image representing what the first user views is captured in real time and transmitted to the second user, the second user operates the first image to obtain the second image, and the second image is displayed to the first user in real time, for achieving an objective of capturing an image in real time by one party, and transmitting the image to another party, thereby achieving a real-time interactions between different users, and further solving a technical limitation to image processing and transmission performed in existing augmented reality technology.

In one implementation, the displaying of the second image in the first augmented reality device may include: determining whether the second image and the first image are similar; displaying the first image by using the first augmented reality device when determining that the second image and the first image are similar; and superimposing the second image onto the first image in the first augmented reality device to obtain a superposed image when determining that the second image and the first image are not similar, and displaying the superimposed image.

When the first image and the second image are similar, it indicates that the images at the two ends contains similar contents (or the second augmented reality device has not altered the first image significantly), and a locally captured image rather than received image is displayed at a local end by using the augmented reality device at the local end. Assuming that the first augmented reality device is a device at the local end and the second augmented reality device is a device of the other party, the first augmented reality device may directly display the first image (e.g., the captured image by the first augmented reality device) when the first image and the second image are similar.

When the first image and the second image are not similar, then the captured local image may be displayed at the local end, together with image information that is included in the received image from the other party and different from the locally captured image. In one implementation, the image synchronized from the other party may be superimposed to the local image, and a superimposed image rather than only the local image is displayed by the local augmented reality device when the first image and the second image are not similar. In an example in which the first augmented reality device is a device at the local end, the second image is superimposed onto the first image in the first augmented reality device, and the superimposed image is displayed in the first augmented reality device. In this case, the first augmented reality device shows a processed image including both content of the first image and the content of added by the second augmented reality device.

In one implementation, the action or operation by the second user based on viewing the first image displayed by the second augmented reality device and/or the environment of the second user is captured and recorded by the second augmented reality device. This image may be communicated to the first augmented reality device as a difference image and may be superposed by the first augmented device onto the first image. The superposed image may be displayed to the first user by the first augmented reality device.

In one implementation, the first image and the second image are determined to be similar when a difference in the content of the first image and the second image is below a predefined difference threshold. For example, RGB pixel values of the first image and the second image may be compared pixel by pixel to obtain a sum of the difference of the RGB pixel values between the first image and the second image. The difference may be measured in absolute value or relative value with respect to the sum of the RGB values of one of the images. The difference threshold (either absolute or relative) may be predefined.

In one implementation, the superimposing of the second image to the first image in the first augmented reality device includes: identifying a first difference image of the second image relative to the first image; converting the first difference image to a second difference image based on a display or viewing angle of the first augmented reality device; and superimposing the second difference image onto the first image.

When it is determined that the images at the two ends are not similar, a difference image is obtained (by, e.g., taking a difference of the images pixel by pixel), and is converted to an image based on a locally displayed angle. The converted difference image is then superimposed onto the local image, thereby reducing the amount of data information to be superposed and improving synchronization efficiency between the first and the second augmented reality devices.

In one implementation, the capturing of the first image in the viewing range of the first augmented reality device in real time includes: detecting a first retinal viewing angle of the first user; and capturing the first image in real time according to the first retinal viewing angle.

A retinal viewing angle of the first user is detected, and an image is captured in real time according to the retinal viewing angle. Thus, after the second user receives the image, the image seen by the second user is consistent with the view seen by the first user. The second user thus sees an image similar to watching the view seen by the first user in a same position and along a same viewing angle as the first user. If no retinal imaging angle of the first user is detected, or no image is captured in real time according to the detected retinal viewing angle, after the second user receives the image, an image viewed by the second user may be inconsistent with the image viewed by the first user. Operation by the second user based on the first image may be affected.

In one implementation, the imaging range of the first augmented reality device is a viewing range of the first user. That is, the first augmented reality device (via its camera) collects images based on the viewing range of the first user, to obtain the first image.

In one implementation, after the first image is synchronized to the second augmented reality device, and before the second image is received from the second augmented reality device, the image processing and transmission method for augmented reality provided in this embodiment of the present disclosure further includes: recording a virtual image operated by the second user and recording an action or operation performed by the second user on the virtual image, where the virtual image is an image provided by the second augmented reality device to the second user, and the virtual image includes at least the first image; and superimposing onto the virtual image with an image that represents the action or operation by the second user to obtain the second image.

After the first image is synchronized to the second augmented reality device, the second augmented reality device displays the first image to the second user. In a displaying process, an image of an environment in which the second user is located is further involved. Therefore, the displayed virtual image includes the first image and additionally the image of the environment in which the second user is located. The second user performs an operation according to the virtual image, and superimposes the operation action of the second user onto the virtual image, to obtain the second image.

In one implementation, the recording of a virtual image operated by the second user and recording of an operation or action performed by the second user on the virtual image includes: detecting a second retinal viewing angle of the second user; and recording the virtual image and the operation action according to the second retinal viewing angle.

The second retinal viewing angle of the second user is detected, and the virtual image and the action or operation are recorded according to the second retinal viewing angle. After the first user receives an image that displays an operation action of the second user, a viewing angle of the image by the first user is consistent with the viewing angle of the second user when performing the action or operation. As such, the first user can view the action or operation of the second user from the same position and along same angle as the second user. As a result, the first user may perform an action or operation more accurately following the action and operation by the second user according to what is shown in the second image.

In one implementation, the recording of the virtual image and the action or operation according to the second retinal viewing angle includes: recording the virtual image and the action or operation in a viewing range of the second augmented reality device according to the second retinal viewing angle. That is, the action or operation performed by the second user on the virtual image is recorded in the viewing range of the second augmented reality device according to the retinal viewing angle of the second user.

In one implementation, the viewing range of the second augmented reality device is a viewing range of the second user. The second augmented reality device collects images of the environment of the second user (using its camera) based on the viewing range of the second user, to obtain the image of the environment of the second user and the action or operation.

For example, someone at home may suddenly become sick and needs an emergency treatment. Healthcare workers may not be able to arrive in time due to traffic congestion or other delays. Family members of the patient may not have sufficient first-aid knowledge. In this case, effective treatment may not be provided in time, leading to preventable further injury or death. The image processing and transmission method for augmented reality provided in this embodiment of the present disclosure may help provide effective treatment in this situation. For example, a family member of the patient may capture an image of the patient in real time by using a device A, where the device A is the first augmented reality device, the image of the patient is the first image, and the family member of the patient is the first user. The image of the patient is transmitted to a device B used by a doctor, where the doctor is the second user, and the device B is a device providing an augmented reality image to the second user. The image of the patient is a virtual patient for the doctor, and after seeing the image of the patient, the doctor performs a treatment action or operation on the virtual patient. An image showing the doctor operating on the virtual patient is the second image. The device B transmits the second image to the device A. The device A displays the second image showing how the doctor operates on virtual patient. After seeing the image, the family member of the patient may treat the patient according to the operation of the doctor. In addition, the device A and device B capture and transmit the image in real time. As such, when the family member of the patient treats the patient according to the operation of the doctor, the device A may further records an image capturing how the family member of the patient treats the patient and transmits the image to the device B. Device B may display the image showing how the family member of the patient treats the patient to the doctor. The doctor may perform a next operation on the virtual patient, and the device B may record such next operation performed by the doctor on the virtual patient, and transmits a next image to the device A. After receiving the next image, the device A may display the next image showing how the doctor performs the next operation on the virtual patient, and the family member of the patient may then perform the next treatment on the real patient according to the next image. The process continues until the treatment ends.

For another example, products (such as industrial equipment and machines) manufactured by company E may be sold and installed in multiple user locations. When a product installed in a particular location needs repair, company E may send a professional (such as a service engineer) to fly to the location to inspect and repair the product. Over time, a large expense may be incurred to company E. The problem can be dealt using the image processing and transmission method for augmented reality provided in this embodiment of the present disclosure. An operator of the product installed at the location may use a device 1 to capture and record an image of the product that needs to be repaired, where device 1 may be the first augmented reality device, the operator may be the first user, and the image of the installed product that needs to be repaired may be the first image. A service engineer of company E at a remote location may use a device 2 to receive the first image of the installed product in need of repair. Device 2 may be the second augmented reality device and the service engineer of company E may be the second user. The first image sent to the service engineer of company E thus may contain a virtual product. The field engineer may operate on the virtual product in his environment (containing tools and equipment needed to perform a virtual repair of the virtual product). Device 2 (the second augmented reality device) may capture and records an image (the second image) including the virtual product and the view of the service engineer when operating on and repairing the virtual product. The second augmented reality device may transmits the second image to device 1. Device 1 then displays to the operator of the installed product the second image including the virtual product and the view of the field engineer when operating on and repairing the virtual product. The operator of the installed product may perform repairs on the actually installed product following how the service engineer performs the virtual repair on the virtual product according to the second image. Device 1 may further capture and record a new image showing how the operator performs the repair on the installed product following the second image and transmits the new image to device 2. Device 2 may further display the new image to shown the field engineer how the operator performs repairs on the actual product. The field engineer of company E may performs a next operation (repair step) on the virtual product. Device 2 may capture and record a next image showing a view from the service engineer when performing the next operation (the next repair step). Device 2 may transmit the next image to device 1. Device 1 may receive the next image and displays the next image to the operator of the installed product. The operator then performs a next operation on the actual installed product according to the next image. As such, the repair process continues until the operator of the installed product finishes repairing the product.

It should be noted that, for ease of description, the foregoing method embodiments are represented as a series of combination of steps in a certain order, but a person of ordinary skill in the art should understand that, the present disclosure is not limited to the described action order. These steps may be performed in other alternative orders or performed simultaneously. Further, a person of ordinary skill in the art should understand that, the implementations described in the specification are merely examples and non-limiting, and the elements included in each implementation are not intended to be necessary elements of these implementations.

The method according to the foregoing embodiments and implementations may be implemented by software, hardware, or combination thereof. For example, the method above may be implemented as a computer software stored in a storage medium (such as a ROM/RAM, a magnetic disk, or an optical disc) as instructions executable by a computer device (which may be a mobile phone, a computer, a server, a network device, or the like) to perform the method described in the embodiments of the present disclosure.

Embodiment 2

According to this embodiment of the present disclosure, an image processing and transmission apparatus configured to implement the image processing and transmission method for augmented reality described above is further provided and described in detail below.

Figure 3:
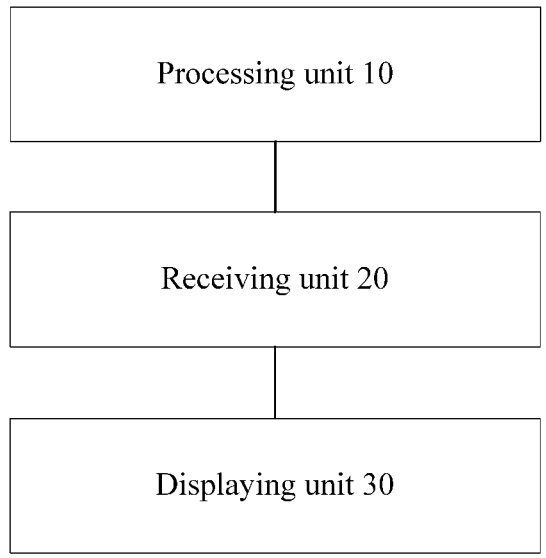
FIG. 3 is a schematic diagram of an image processing and transmission apparatus for augmented reality according to an embodiment of the present disclosure.

FIG. 3 is a schematic diagram of an image processing and transmission apparatus for augmented reality according to an embodiment of the present disclosure. As shown in FIG. 3, the image processing and transmission apparatus for augmented reality mainly includes a processing unit 10, a receiving unit 20, and a displaying unit 30.

The processing unit 10 is configured to capture a first image in a viewing range of a first augmented reality device in real time, and synchronize the first image to a second augmented reality device, where the first augmented reality device is a device providing an augmented reality image to a first user, and the second augmented reality device is a device providing an augmented reality image to a second user.

The receiving unit 20 is configured to receive a second image from the second augmented reality device, where the second image is an image returned in real time by the second user after operating on the first image via the second augmented reality device.

The displaying unit 30 is configured to display the second image by using the first augmented reality device.

In this embodiment of the present disclosure, the first user and the second user are different users at different locations. The first user has a first augmented reality device, the second user has a second augmented reality device, and the first augmented reality device and the second augmented reality device may be of the same or different types of augmented reality devices. The first user captures and records a first image by using the first augmented reality device, and synchronizes the first image to the second augmented reality device, the second user operates on the first image from the second augmented reality device, to obtain a second image, and returns the second image in real time to the first augmented reality device, and the first augmented reality device displays the second image to the first user in real time.

In the image processing and transmission apparatus for augmented reality provided in this embodiment of the present disclosure, the first image representing what the first user views is captured in real time and transmitted to the second user, the second user operates the first image to obtain the second image, and the second image is displayed to the first user in real time for achieving an objective of capturing an image in real time by one party, and transmitting the image to another party, thereby achieving real-time interactions between different users, and further solving a technical limitation to image processing and transmission performed in existing augmented reality technology.

In one implementation, the displaying unit 30 mainly includes a determining subunit, a first displaying subunit, and a second displaying subunit, where the determining subunit is configured to determine whether the second image and the first image are similar; the first displaying subunit is configured to display the first image by using the first augmented reality device when the determining subunit determines that the second image and the first image are similar; and the second displaying subunit is configured to superimpose the second image onto the first image in the first augmented reality device to obtain a superposed image when the determining subunit determines that the second image and the first image are not similar, and display the superimposed image.

When the first image and the second image are similar, it indicates that the images at the two ends contains similar contents (or the second augmented reality device has not altered the first image significantly), and a locally captured image rather than received image is displayed at a local end by using the augmented reality device at the local end. Assuming that the first augmented reality device is a device at the local end and the second augmented reality device is a device of the other party, the first augmented reality device may directly display the first image (e.g., the captured image by the first augmented reality device) when the first image and the second image are similar. When the first image and the second image are not similar, then the captured local image may be displayed at the local end, together with image information that is included in the received image from the other party and different from the locally captured image. In one implementation, the image synchronized from the other party may be superimposed to the local image, and a superimposed image rather than only the local image is displayed by the local augmented reality device when the first image and the second image are not similar. In an example in which the first augmented reality device is a device at the local end, the second image is superimposed onto the first image in the first augmented reality device, and the superimposed image is displayed in the first augmented reality device.

In one implementation, the first image and the second image are determined to be similar when a difference in the content of the first image and the second image is below a predefined difference threshold. For example, RGB pixel values of the first image and the second image may be compared pixel by pixel to obtain a sum of the difference of the RGB pixel values between the first image and the second image. The difference may be measured in absolute value or relative value with respect to the sum of the RGB values of one of the images. The difference threshold (either absolute or relative) may be predefined.

In one implementation, the second displaying subunit mainly includes an identification module, a conversion module, and a superposition module, where the identification module is configured to identify a first difference image of the second image relative to the first image; the conversion module is configured to convert the first difference image to a second difference image based on a display or viewing angle of the first augmented reality device; and the superposition module is configured to superimpose the second difference image onto the first image.

When it is determined that the images at the two ends are not similar, a difference image is obtained (by, e.g., taking a difference of the images pixel by pixel), and is converted to an image based on a locally displayed angle. The converted difference image is then superimposed onto the local image, thereby reducing the amount of data information to be superposed and improving synchronization efficiency between the first and the second augmented reality devices.

In one implementation, the processing unit 10 mainly includes a first detection subunit and a capturing subunit, where the first detection subunit is configured to detect a first retinal viewing angle of the first user; and the capturing subunit is configured to capture the first image in real time according to the first retinal viewing angle.

A retinal viewing angle of the first user is detected, and an image is captured in real time according to the retinal viewing angle. Thus, after the second user receives the image, the image seen by the second user is consistent with the view seen by the first user. The second user thus sees an image similar to watching the view seen by the first user in a same position and along a same viewing angle as the first user. If no retinal imaging angle of the first user is detected, or no image is captured in real time according to the detected retinal viewing angle, after the second user receives the image, an image viewed by the second user may be inconsistent with the image viewed by the first user. Operation by the second user based on the first image may be affected.

In one implementation, the imaging range of the first augmented reality device is a viewing range of the first user. That is, the first augmented reality device (via its camera) collects images based on the viewing range of the first user, to obtain the first image.

In one implementation, the image processing and transmission apparatus based on augmented reality provided in this embodiment of the present disclosure further includes a recording unit and a superposition unit, where after the processing unit 10 synchronizes the first image to the second augmented reality device, and before the receiving unit 20 receives the second image from the second augmented reality device, the recording unit is configured to record a virtual image operated by the second user and recording an action or operation performed by the second user on the virtual image, where the virtual image is an image provided by the second augmented reality device to the second user, and the virtual image includes at least the first image; and the superposition unit is configured to superimpose onto the virtual image with an image that represents the action or operation by the second user to obtain the second image.

After the first image is synchronized to the second augmented reality device, the second augmented reality device displays the first image to the second user. In a displaying process, an image of an environment in which the second user is located is further involved. Therefore, the displayed virtual image includes the first image and additionally the image of the environment in which the second user is located. The second user performs an operation according to the virtual image, and superimposes the operation action of the second user onto the virtual image, to obtain the second image.

In one implementation, the recording unit mainly includes a second detection subunit and a recording subunit, where the second detection subunit is configured to detect a second retinal viewing angle of the second user; and the recording subunit is configured to record the virtual image and the operation action according to the second retinal viewing angle.

The second retinal viewing angle of the second user is detected, and the virtual image and the action or operation are recorded according to the second retinal viewing angle. After the first user receives an image that displays an operation action of the second user, a viewing angle of the image by the first user is consistent with the viewing angle of the second user when performing the action or operation. As such, the first user can view the action or operation of the second user from the same position and along the same angle as the second user. As a result, the first user may perform an action or operation more accurately following the action and operation by the second user according to what is shown in the second image.

In one implementation, the recording subunit includes a recording module, where the recording module is configured to record the virtual image and the action or operation in a viewing range of the second augmented reality device according to the second retinal viewing angle. That is, the action or operation performed by the second user on the virtual image is recorded in the viewing range of the second augmented reality device according to the retinal viewing angle of the second user.

The viewing range of the second augmented reality device is a viewing range of the second user. The second augmented reality device collects images of the environment of the second user (using its camera) based on the viewing range of the second user, to obtain the image of the environment of the second user.

Embodiment 3

Figure 4:
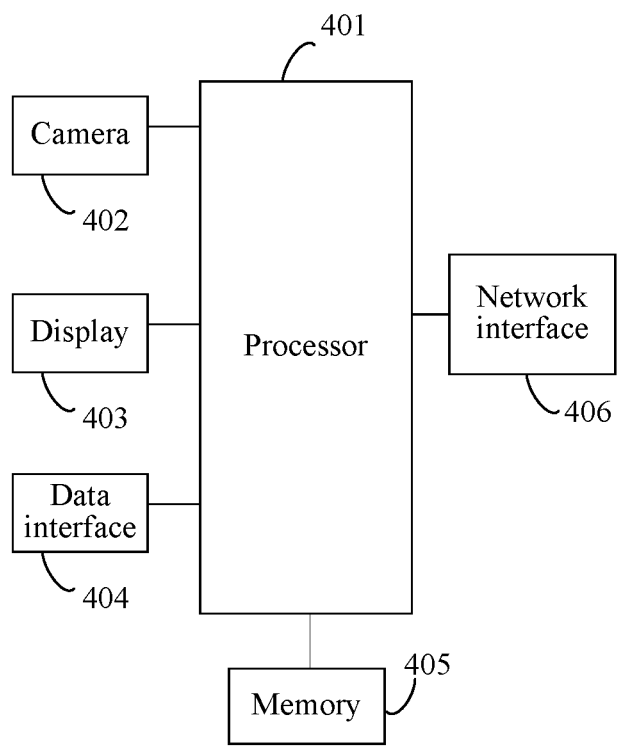
FIG. 4 is a schematic diagram of a mobile terminal that implements an image processing and transmission method for augmented reality according to an embodiment of the present disclosure.

According to this embodiment of the present disclosure, a mobile terminal used for implementing an image processing and transmission method for augmented reality is further provided, and the mobile terminal may be a first augmented reality device, or may be a second augmented reality device. As shown in FIG. 4, the mobile terminal mainly includes a processor 401, a camera 402, a display 403, a data interface 404, a memory 405, and a network interface 406.

The camera 402 is mainly configured to capture a first image in a viewing range of a first augmented reality device in real time, or configured to capture a second image in viewing range of a second augmented reality device in real time.

The data interface 404 mainly transmits image data between the first augmented reality device and the second augmented reality device.

The memory 405 is mainly configured to store an intermediate data for image processing and transmission.

The network interface 406 is mainly configured to perform a network communication with a server, and provide data support for information transmission.

The display 403 is mainly configured to display, in real time, an image that needs to be displayed by the first augmented reality device or the second augmented reality device.

The processor 401 is mainly configured to execute the following operations: capturing a first image in an image range of a first augmented reality device in real time, and synchronizing the first image to a second augmented reality device, where the first augmented reality device is a device providing an augmented reality image to a first user, and the second augmented reality device is a device providing an augmented reality image to a second user; receiving a second image from the second augmented reality device, where the second image is an image returned in real time by the second user after operating the first image based on the second augmented reality device; and displaying the second image by using the first augmented reality device.

The processor 401 is further configured to determine whether the second image and the first image are similar; display the first image by using the first augmented reality device when determining that the second image and the first image are similar; and superimpose the second image onto the first image in the first augmented reality device when determining that the second image and the first image are not similar, and display a superimposed image.

The processor 401 is further configured to identify a first difference image of the second image relative to the first image; convert the first difference image to a second difference image based on a display or viewing angle of the first augmented reality device; and superimpose the second difference image to the first image.

The processor 401 is further configured to detect a first retinal viewing angle of the first user; and capture the first image in real time according to the first retinal viewing angle.

The processor 401 is further configured to record a virtual image operated by the second user and an action or operation performed by the second user on the virtual image, where the virtual image is an image provided by the second augmented reality device to the second user, and the virtual image includes at least the first image; and to superimpose an image that represents the action or operation performed by the second user onto the virtual image, to obtain the second image The processor 401 is further configured to detect a second retinal viewing angle of the second user; and record the virtual image and the operation action according to the second retinal viewing angle.

The processor 401 is further configured to record the virtual image and the action or operation in a viewing range of the second augmented reality device according to the second retinal viewing angle.

For specific examples of implementation, reference may be made to the description in Embodiment 1 and Embodiment 2. Details are not described again in this embodiment.

Embodiment 4

This embodiment of the present disclosure further provides a storage medium.

Optionally, in this embodiment, the storage medium may be used for storing program code or instructions of the image processing and transmission method for augmented reality in this embodiment of the present disclosure. Storage medium may be non-transitory and computer readable.

In one implementation, in this embodiment, the storage medium may be located in at least one of multiple network devices in a network such as a mobile communications network, a wide area network, a metropolitan area network, or a local area network.

In one implementation, the storage medium is set to store program code or instructions used for performing the following steps:

S1. Capture a first image in a viewing range of a first augmented reality device in real time, and synchronize the first image to a second augmented reality device, where the first augmented reality device is a device providing an augmented reality image to a first user, and the second augmented reality device is a device providing an augmented reality image to a second user.

S2. Receive a second image from the second augmented reality device, where the second image is an image returned in real time by the second user after operating the first image via the second augmented reality device.

S3. Display the second image by using the first augmented reality device.

In one implementation, in this embodiment, the storage medium may include but not limited to various media that may store program code, such as a USB flash disk, a read-only memory (ROM), a random access memory (RAM), a removable hard disk, a magnetic disk, or an optical disc.

In one implementation, the processor performs the steps of, according to the program code or instructions stored in the storage medium, determining whether the second image and the first image are similar; displaying the first image by using the first augmented reality device when determining that the second image and the first image are similar; and superimposing the second image onto the first image by using the first augmented reality device when determining that the second image and the first image are not similar, and displaying a superimposed image.

In one implementation, the processor performs the steps of, according to the program code or instructions stored in the storage medium, identifying a first difference image of the second image relative to the first image; converting the first difference image to a second difference image based on a display or viewing angle of the first augmented reality device; and superimposing the second difference image onto the first image.

In one implementation, the processor performs the steps of, according to the program code or instructions stored in the storage medium, detecting a first retinal viewing angle of the first user; and capturing the first image in real time according to the first retinal viewing angle.

In one implementation, the processor performs the steps of, according to the program code or instructions stored in the storage medium, recording a virtual image operated on by the second user and an action or operation performed by the second user, where the virtual image is an image provided by the second augmented reality device to the second user, and the virtual image includes at least the first image; and superimposing an image that represents the action or operation performed by the second user on the virtual image, to obtain the second image.

In one implementation, the processor performs the steps of, according to the program code or instruction stored in the storage medium, detecting a second retinal viewing angle of the second user; and recording the virtual image and the action or operation according to the second retinal viewing angle.

In one implementation, the processor performs the steps of, according to the program code or instructions stored in the storage medium, recording the virtual image and the action or operation action in a viewing range of the second augmented reality device according to the second retinal viewing angle.

For specific examples of this implementation, reference may be made to the description in Embodiment 1 and Embodiment 2. Details are not described again in this embodiment.

The sequence numbers of the foregoing embodiments of the present disclosure are merely for the convenience of description, and are not intended to imply any limitation of order.

When the units integrated in the foregoing embodiments are implemented in a form of a software functional module, the units may be stored in a computer-readable storage medium. Based on such an understanding, the technical solutions of the present disclosure may be implemented in a form of a software product. The computer software as implemented may be stored in a storage medium and includes instructions for instructing one or more computer devices (which may be a personal computer, a server, a network device, or the like) to perform all or a part of the steps of the methods described in the embodiments of the present disclosure.

In the foregoing embodiments and implementations of the present disclosure, the description for each embodiment may be focused on particular aspects. For aspects that are not described in detail in an embodiment, reference may be made to related descriptions in other embodiments.

In the embodiments and implementations provided in the present disclosure, it should be understood that the disclosed devices (such as the particular augmented reality devices described) are merely examples and may be implemented in other manners. For example, the division of the functions into units is merely exemplary and other manners of division may be used in actual implementation. For example, a plurality of units or components described above may be combined or integrated into a single component or a system.

Not all features need to be implemented. In addition, the couplings or communication connections between various components may be implemented via different types of interfaces, such as electric interfaces or other interfaces.

The units described as separate parts may or may not be physically separate. The parts described or implemented as units may or may not be physical units. They may be centralized in one location, or may be distributed over in a network. Part of or all of the units described above may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The foregoing integrated units may be implemented in a form of hardware or may be implemented in a form of a software functional module.

The foregoing descriptions are merely exemplary implementations of the present disclosure. It should be noted that a person of ordinary skill in the art may further make modifications or improvements without departing from the concept of the present disclosure, and these modifications or improvements should all fall within the protection scope of the present disclosure.

What is claimed is:

1. A method for generating augmented reality, comprising:
   capturing a first image in a viewing range of a first augmented reality device in real time via a camera of the first augmented reality device, and synchronizing the first image to a second augmented reality device, the first augmented reality device comprising a first memory having stored therein a first set of instructions and a first processor for executing the first set of instructions to provide an augmented reality image to a first user via a first display, and the second augmented reality device comprising a second memory having stored therein a second set of instructions and a second processor for executing the second set of instructions to provide an augmented reality image to a second user via a second display;
   receiving a second image from the second augmented reality device, the second image being an image returned in real time by the second augmented reality device after augmenting the first image by the second augmented reality device;
   determining whether the second image and the first image are similar;
   generating the augmented reality image to the first display at the first augmented reality device based on the first image alone when determining that the second image and the first image are similar;
   when determining that the second image and the first image are not similar:
      identifying a first difference image of the second image relative to the first image;
      converting the first difference image to a second difference image based on a viewing angle of the first augmented reality device; and
      superimposing the second difference image onto the first image; and
   displaying the augmented reality image in the first user in the first display of the first augmented reality device.

2. The method according to claim 1, wherein capturing the first image in the viewing range of the first augmented reality device in real time via the camera of the first augmented reality device comprises:
   detecting a first retinal viewing angle of the first user; and
   capturing the first image in real time via the camera according to the first retinal viewing angle.

3. The method according to claim 1, wherein the viewing range of the first augmented reality device corresponds to a viewing range of the first user.

4. The method according to claim 1, after synchronizing the first image to the second augmented reality device, and before receiving the second image from the second augmented reality device, further comprising:
   recording, by the second augmented reality device, a virtual image and an operation action by second user based on viewing the virtual image, the virtual image being an image provided by the second augmented reality device to the second user, and the virtual image comprising at least the first image; and
   superimposing, by the second augmented reality device, an image that represents the operation action onto the virtual image to obtain the second image.

5. The method according to claim 4, wherein recording the virtual image and the operation action comprises:
   detecting a second retinal viewing angle of the second user; and
   recording the virtual image and the operation action according to the second retinal viewing angle.

6. The method according to claim 5, wherein recording the virtual image and the operation action according to the second retinal viewing angle comprises:
   recording the virtual image and the operation action in a viewing range of the second augmented reality device according to the second retinal viewing angle.

7. The method according to claim 6, wherein the viewing range of the second augmented reality device corresponds to a viewing range of the second user.

8. A system comprising a first augmented reality device for providing an augmented reality image to a first user via a first display, the first augmented reality device comprising a camera, a memory having instructions stored therein, and a processor in communication with the camera and the memory, wherein the processor, when executing the instructions, is configured to cause the first augmented reality device to:
   capture a first image via the camera in a viewing range of the first augmented reality device in real time, and synchronize the first image to a second augmented reality device, the second augmented reality device comprising a device providing an augmented reality image to a second user via a second display;
   receive a second image from the second augmented reality device, the second image being an image returned in real time by the second augmented reality device after augmenting the first image by the second augmented reality device;
   determine whether the second image and the first image are similar;
   generate the augmented reality image to the first display at the first augmented reality device based on the first image alone when the second image and the first image are similar;
   when determining that the second image and the first image are not similar:
      identify a first difference image of the second image relative to the first image;

convert the first difference image to a second difference image based on a viewing angle of the first augmented reality device; and superimpose the second difference image onto the first image; and display the augmented reality image in the first user in the first display.

9. The system according to claim 8, wherein the processor, when executing the instructions to cause the first augmented reality device to capture the first image via the camera in the viewing range of the first augmented reality device in real time, is configured to cause the first augmented reality device to:

detect a first retinal viewing angle of the first user; and capture the first image in real time via the camera according to the first retinal viewing angle.

10. The system according to claim 8, wherein the viewing range of the first augmented reality device corresponds to a viewing range of the first user.

11. The system according to claim 8, further comprising the second augmented reality device configured to:

record a virtual image and an operation action by second user based on viewing the virtual image, the virtual image being an image provided by the second augmented reality device to the second user, and the virtual image comprising at least the first image; and superimpose an image that represents the operation action onto the virtual image to obtain the second image.

12. The system according to claim 11, wherein the second augmented reality device, to record the virtual image and the operation action, is configured to:

detect a second retinal viewing angle of the second user; and record the virtual image and the operation action according to the second retinal viewing angle.

13. The system according to claim 12, wherein the second augmented reality device, to record the virtual image and the operation action according to the second retinal viewing angle, is configured to:

record the virtual image and the operation action in a viewing range of the second augmented reality device according to the second retinal viewing angle.

14. The system according to claim 13, wherein the viewing range of the second augmented reality device corresponds to a viewing range of the second user.

15. A computer-readable and non-transitory storage medium having storing instructions stored therein, the instructions, when executed by a processor of a first augmented reality device for providing an augmented reality image to a first user via a first display, causes the first augmented reality device to:

capture a first image in a viewing range of the first augmented reality device in real time, and synchronizing the first image to a second augmented reality device, the second augmented reality device being a device providing an augmented reality image to a second user via a second display;

receive a second image from the second augmented reality device, the second image being an image returned in real time by the second augmented reality device after augmenting the first image by the second augmented reality device;

determine whether the second image and the first image are similar;

generate the augmented reality image to the first display at the first augmented reality device based on the first image alone when the second image and the first image are similar;

when determining that the second image and the first image are not similar: identify a first difference image of the second image relative to the first image; convert the first difference image to a second difference image based on a viewing angle of the first augmented reality device; and superimpose the second difference image onto the first image; and display the augmented reality image in the first display at the first augmented reality device.

* * * * *